BERTHOLD HUBER.
Improvement in Printing Presses.
No. 120,646. Patented Nov. 7, 1871.

Witnesses:
A. W. Almqvist
Chas. Nida

Inventor:
Berthold Huber
per Munn & Co
Attorneys.

UNITED STATES PATENT OFFICE.

BERTHOLD HUBER, OF WILLIAMSBURG, NEW YORK.

IMPROVEMENT IN PRINTING-PRESSES.

Specification forming part of Letters Patent No. 120,646, dated November 7, 1871.

To all whom it may concern:

Be it known that I, BERTHOLD HUBER, of Williamsburg, in the county of Kings and State of New York, have invented certain Improvements in Movement for Printing-Presses; and I do hereby declare that the following is a full, clear, and exact description thereof, which will enable others skilled in the art to make and use the same, reference being had to the accompanying drawing forming part of this specification, in which—

Figure 1:
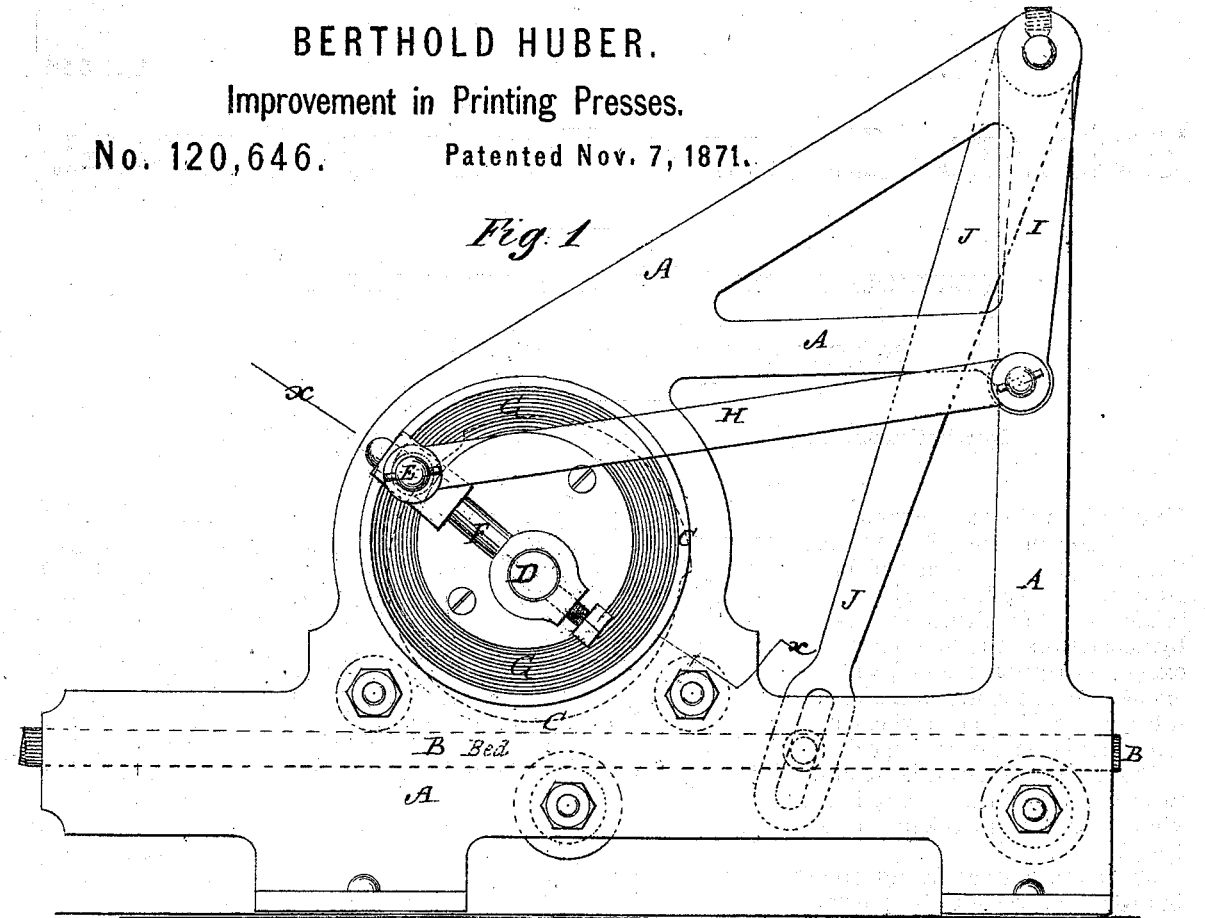
Figure 2:
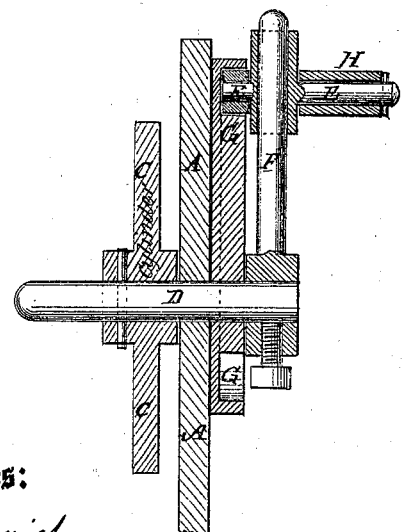

Figure 1 is a detail view, illustrating my improved movement. Fig. 2 is a detail sectional view of the same taken through the line x x, Fig. 1.

My invention has for its object to furnish an improved movement for printing-presses, which shall be so constructed and arranged as to cause the cylinder and bed-plate to move at the same rate of speed while in contact, but will cause the bed-plate to move at a greater rate of speed while the cylinder and bed-plate are not in contact, thus enabling the cylinder to be made smaller than is possible when the cylinder and bed-plate move always at the same velocity; and it consists in the construction and combination of various parts of the press, as hereinafter more fully described.

A represents the frame-work of the press, and B the bed-plate, which moves back and forth upon friction-rollers or ways in the ordinary manner. C represents the cylinder, the journals D of which revolve in bearings in the frame A. E is a crank-pin, which slides upon a radial rod, F, rigidly connected with the journal D. The rod F may be a part of the pulley to which the power is applied, or may be attached to said pulley. The inner end of the crank-pin E, which should have a friction-roller placed upon it, moves in a cam-groove, G, attached to the frame A, so as to vary the length of the crank and thus vary the rate of movement of the bed-plate B driven by said crank, the said groove being so arranged that the bed-plate B and cylinder C may move at the same rate of speed while in contact, and the bed-plate at a greater rate of speed while the cylinder and bed-plate are not in contact. To the ohter end of the crank-pin E is pivoted the end of the connecting-rod H, the outer end of which is pivoted to the lever I, which is pivoted to the frame A. J is a lever, rigidly connected to or formed solid with the lever I, and the lower part of which is connected with the bed-plate B by a pin and slot, as shown in Fig. 1, or by a rack and pinion, or by other convenient means.

By moving the pivoting point of the levers I J toward the cylinder the levers I J may be made in one piece, and in the form of quadrant or other sector of a circle, slotted radially to receive the outer end of the crank-pin E, and having teeth upon its arc to mesh into a pinion-wheel and thus drive the bed-plate.

Having thus described my invention, I claim as new and desire to secure by Letters Patent—

1. The varying crank E F, in combination with the guide-groove G and the cylinder of a printing-press for driving the bed-plate B with a variable motion, substantially as herein shown and described, and for the purposes set forth.

2. The combination of the levers I J or equivalent with the bed-plate B, variable crank E F, guide-groove G, and cylinder C for connecting the said variable crank with the said bed-plate, substantially as herein shown and described, and for the purpose set forth.

The above specification of my invention signed by me this 23d day of August, 1871.

BERTHOLD HUBER.

Witnesses:
JAMES T. GRAHAM,
T. B. MOSHER.

(117)